US009802118B2

(12) United States Patent
Hirshberg et al.

(10) Patent No.: US 9,802,118 B2
(45) Date of Patent: Oct. 31, 2017

(54) GAME CONTROLLER WITH CLAMP FOR PORTABLE DEVICE

(71) Applicant: Activision Publishing, Inc., Santa Monica, CA (US)

(72) Inventors: Eric Hirshberg, Santa Monica, CA (US); Lee Guinchard, Santa Monica, CA (US); Duncan Miller, Santa Monica, CA (US); Tim Clark, Santa Monica, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 182 days.

(21) Appl. No.: 14/574,219

(22) Filed: Dec. 17, 2014

(65) Prior Publication Data

US 2015/0174482 A1   Jun. 25, 2015

Related U.S. Application Data

(60) Provisional application No. 61/918,586, filed on Dec. 19, 2013.

(51) Int. Cl.
| | |
|---|---|
| *A63F 13/00* | (2014.01) |
| *A63F 13/24* | (2014.01) |
| *A63F 13/98* | (2014.01) |
| *A63F 13/92* | (2014.01) |

(52) U.S. Cl.
CPC .............. *A63F 13/24* (2014.09); *A63F 13/92* (2014.09); *A63F 13/98* (2014.09)

(58) Field of Classification Search
CPC ........ A63F 13/20; A63F 13/21; A63F 13/218; A63F 13/22; A63F 13/24
USPC ...................................................... 463/36, 37
See application file for complete search history.

(56) References Cited

U.S. PATENT DOCUMENTS

| 7,653,771 B2* | 1/2010 | Liberty | ................. | G06F 1/1632 |
| | | | | 463/37 |
| 9,118,750 B2* | 8/2015 | Vossoughi | .............. | B60R 11/02 |
| 2004/0137983 A1* | 7/2004 | Kerr | ........................ | A63F 13/02 |
| | | | | 463/29 |
| 2004/0195305 A1* | 10/2004 | Dotson | ................. | G06F 1/1632 |
| | | | | 235/145 R |
| 2007/0060393 A1* | 3/2007 | Wu | ......................... | A63F 13/06 |
| | | | | 463/47 |
| 2008/0096620 A1* | 4/2008 | Lee | ........................ | G06F 1/1626 |
| | | | | 455/575.8 |
| 2012/0189156 A1* | 7/2012 | Leung | ................... | G06F 1/1632 |
| | | | | 381/387 |

* cited by examiner

*Primary Examiner* — James S McClellan
(74) *Attorney, Agent, or Firm* — Klein, O'Neill & Singh, LLP (57) ABSTRACT

A game controller for use with handheld game devices, for example smartphones, includes a cradle for holding the smartphone. The cradle is pivotable between an open position, extending from a base of the game controller, and a closed position in which the cradle is about a bottom wall of the base.

20 Claims, 13 Drawing Sheets

GAME CONTROLLER WITH CLAMP FOR PORTABLE DEVICE

CROSS REFERENCE TO RELATED APPLICATIONS

This application claims the benefit of the filing of U.S. Provisional Patent Application No. 61/918,586, filed on Dec. 19, 2013, the disclosure of which is incorporated by reference herein.

BACKGROUND OF THE INVENTION

The present invention relates generally to videogame systems, and more particularly to videogame controllers for use with smartphone videogames.

Videogames are enjoyed by many, often allowing videogame players to virtually participate in otherwise unavailable activities, whether due to requirements of skill, experience, or equipment availability, or simply due to inherent dangers of the activities.

With the somewhat recent proliferation of smartphones, some players are increasingly playing videogames using their smartphones. Videogame play on smartphones, however, may have unsatisfying aspects. Input devices on smartphones may not provide a degree of precision and accuracy desired by videogame players, detracting from game play. In addition, videogame players may be accustomed to videogame play using particular input devices, for example analog control sticks and the like often found on a game controller for a game console. Transitioning to the use of new input devices also may degrade videogame play experience. Unfortunately, however, benefits of smartphones, for example their ease of portability and capability for near instantaneous communication, may be degraded if videogame players were to carry a videogame console game controller along with their smartphone.

BRIEF SUMMARY OF THE INVENTION

Some aspects of the invention relate to videogame controllers for use with smartphones. One aspect of the invention provides a videogame controller, comprising: a housing having a top wall and a bottom wall coupled by side walls; a plurality of input devices extending through the top wall of the housing; and a cradle, dimensioned to hold a handheld device, pivotably coupled to the housing, the cradle pivotable from a position about the bottom wall of the housing to a position extending away from the housing. Some aspects of the invention provide that the cradle includes a backing and opposing first and second arms, the first arm extending from about a first end of the backing and the second arm extending from about a second end of the backing, the first and second ends of the backing being opposing ends of the backing.

Another aspect of the invention provides a videogame controller device, comprising: a base including a plurality of input devices; and a cradle hingedly coupled to the base so as to be moveable from a closed to an open position, the cradle including a substantially square U-shaped bracket for receiving a smartphone, the cradle including a post insertable into a cavity of the base when the cradle is in the open position.

These and other aspects of the invention are more fully comprehended upon review of this disclosure.

DETAILED DESCRIPTION

In accordance with some aspects of the invention, a game controller includes a plurality of input devices and a cradle for holding a handheld display device, for example a smartphone (or portable media player, personal digital assistant, or other handheld device), in a viewable position. Circuitry of the game controller may be in communication with circuitry of the display device by way of wireless communication circuitry. The handheld display device may include one or more processors for executing game program instructions, including processing of inputs from the game controller, with results of game play displayed on a display of the display device.

Figure 1:
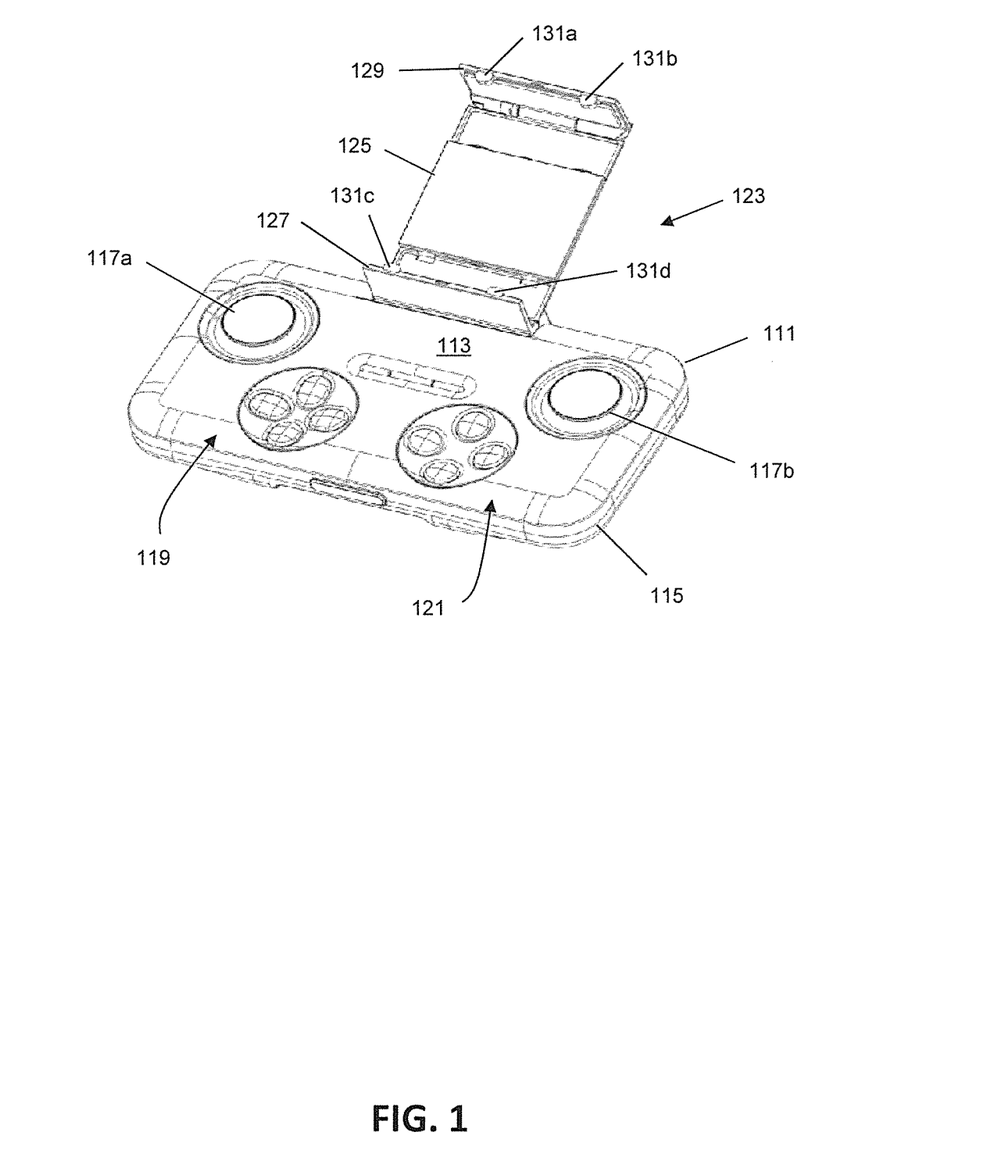
FIG. 1 is a top perspective view of a game controller in accordance with aspects of the invention.

FIG. 1 illustrates a top perspective view of a game controller in accordance with aspects of the invention. The game controller includes a base 111 and a cradle 123. The base is formed of a housing with a top wall 113 and a bottom wall (not visible in FIG. 1) coupled by side walls 115. In some embodiments the base is substantially dimensioned to be similar in size and shape to a smartphone or other handheld display device.

A plurality of user input devices extend through the top wall of the base. In the embodiment illustrated in FIG. 1, the input devices include a pair of analog sticks 117a,b, a plurality of game pad buttons 119, and a plurality of directional buttons 121. The input devices are coupled to circuitry within the base, with a battery or other power source within the base as well in some embodiments. In most embodiments the circuitry within the base communicates information as to the state of the input devices to a controller executing a game program.

The cradle 123 is pivotably coupled to the base, in a hinged fashion in various embodiments. The cradle includes a backing 125, with an extending bottom arm 127 and an extending top arm 129. The arms extend from opposing ends of the backing. The arms are, in many embodiments, pivotably coupled to the backing, allowing the arms to be pivoted to an extended or open position, or pivoted to a closed position substantially parallel to the backing. As illustrated in FIG. 1, with the arms in the extended position, the arms extend generally in the same direction and generally orthogonal to a plane defined by the backing. In embodiments in which the backing and the arms are each generally planar, the cradle may be considered to be of a generally square U-shape.

Tabs 131*a,b* extend from about an end of the top arm, with the tabs extending inward towards the bottom arm. Similarly, tabs 131*c,d* extend from about an end of the bottom arm, inwardly towards the top arm. The tabs help to retain a device, such as a smartphone or other handheld display device, held by the cradle. For example, in some embodiments the arms oppose each other by a distance about equal to a width of a smartphone, and have a length slightly greater than a depth of the smartphone (with the smartphone having a height, a width, and a depth, with a display on a surface substantially extending over the height and the width). In such embodiments the tabs assist in holding the smartphone in the cradle, with the tabs extending slightly over a surface of the smartphone.

Figure 2:
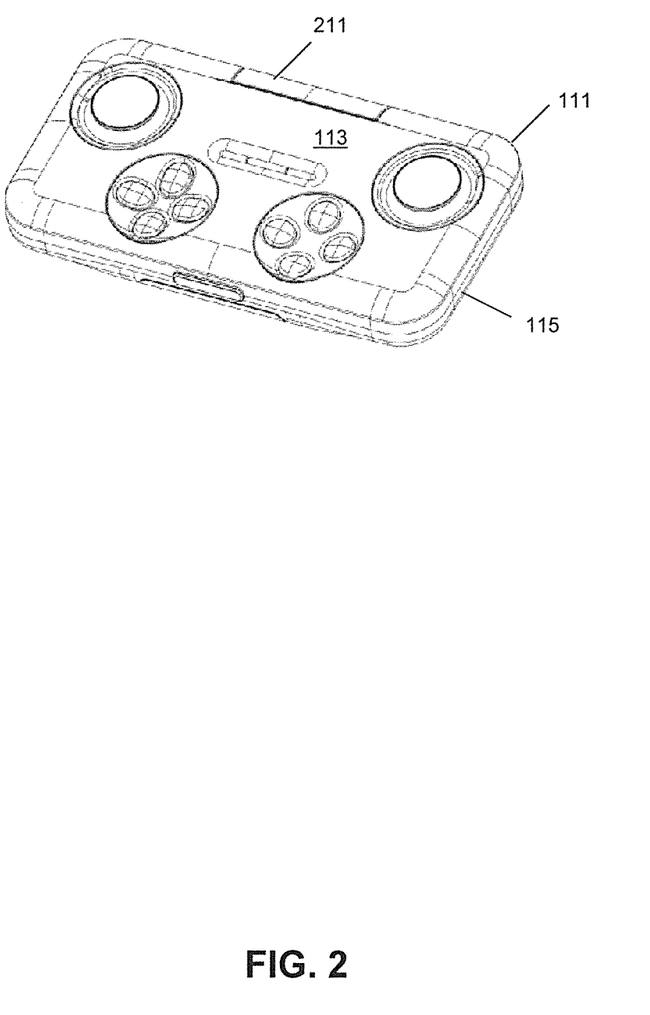
FIG. 2 is a further top perspective view of the game controller of FIG. 1.

FIG. 2 illustrates a top perspective view of the game controller of FIG. 1 with the cradle pivoted, or rotated, to a closed position. In the closed position the cradle has been pivoted out of view about the bottom wall of the base 111. Accordingly, while the top wall 113 and sidewalls 115 are generally visible for the base, as is a portion of hinge structure 211 for the cradle, the cradle is generally out of view. The hinge structure for or of the cradle is generally within a cutout of the sidewall of the base and preferably provides a generally continuous surface with the sidewall when the cradle is in the closed position.

Figure 3:
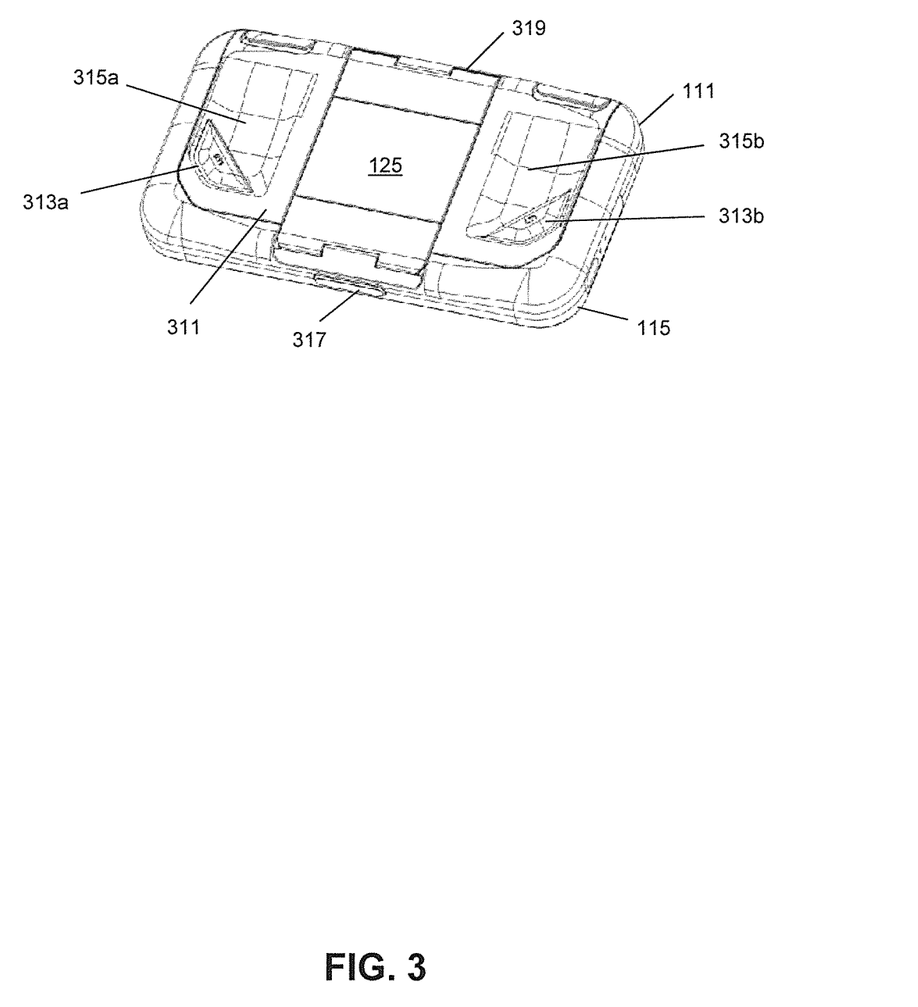
FIG. 3 is a bottom perspective view of the game controller of FIG. 1.

FIG. 3 illustrates a bottom perspective view of the game controller of FIG. 1, with the cradle in the closed position. In the closed position, the backing 125 of the cradle is within a latitudinal cutout across the bottom wall 311 of the base 111. The cradle is coupled to the base by way of hinges 319, with a closed position locking mechanism maintaining the cradle in the closed position. The closed position locking mechanism is unlockable through use of a button 317 on a sidewall 115 of the base.

The base also includes additional user input devices on its bottom wall in some embodiments. As shown in FIG. 3, buttons in the form of sliding input devices 313*a,b* are disposed in hollows 315*a,b* of the bottom wall. The buttons correspond, in operation, to shoulder buttons of game controllers for game consoles, in some embodiments. The hollows are on opposing sides of the latitudinal cutout in the base holding the closed cradle.

Figure 4:
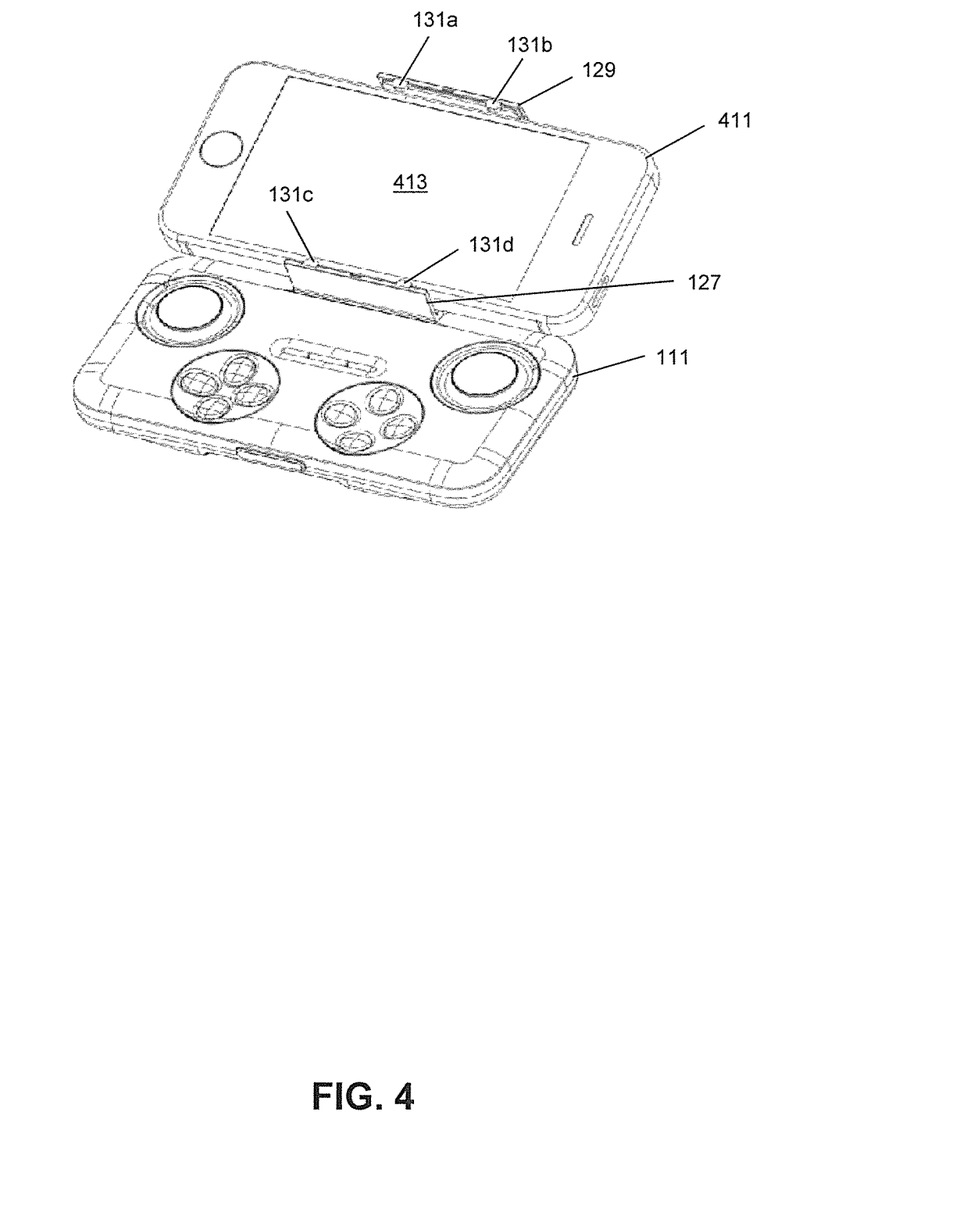
FIG. 4 is a further top perspective view of the game controller of FIG. 1 with a smartphone held in a cradle.

FIG. 4 illustrates a further top perspective view of the game controller of FIG. 1, with the cradle in the open position, extending from the base 111, and retaining a smartphone 411. The smartphone is held between the top arm 129 and the bottom arm 127 of the cradle. As illustrated in FIG. 4, the top arm and the bottom arm are against opposing sides of the smartphone, with the opposing sides separated by the width of the smartphone. The tabs 131*a-d* assist in the cradle retaining the smartphone, with the tabs extending partially over a top surface of the smartphone, but not necessarily contacting the top surface of the smartphone.

In the open position, the cradle is at a slight angle from a plane defined by the base, allowing for easier viewing of a face, including a display 413, of the smartphone. In the embodiment of FIG. 4, the base has a width substantially equal to a height of the smartphone.

Figure 5:
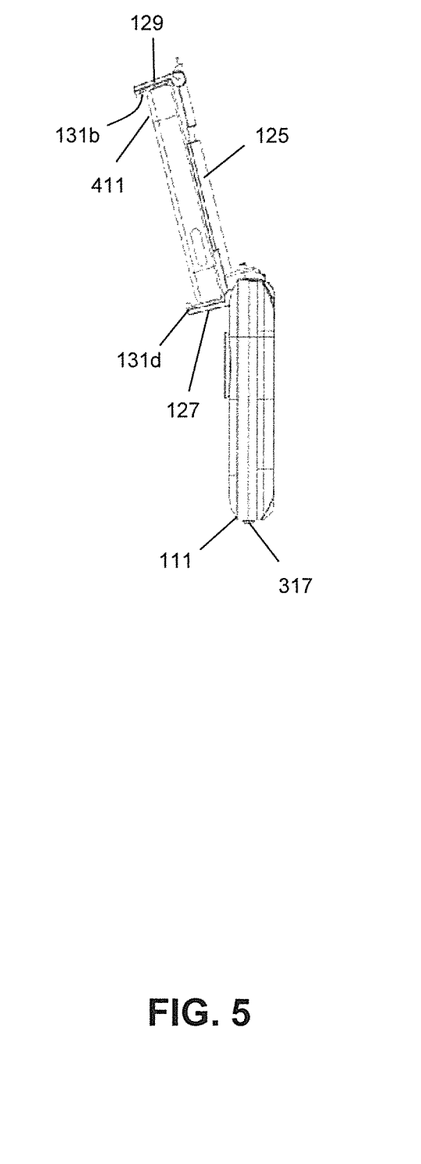
FIG. 5 is a side view of the game controller and smartphone of FIG. 4.

FIG. 5 illustrates a side view of the game controller of FIG. 1 with the cradle in the open position and retaining the smartphone 411. The cradle extends at a slight angle from the base 111 (with the button 317 for operating the closed position locking mechanism also visible). With the cradle retaining the smartphone, a rear of the smartphone is about, and in FIG. 5 abuts, the backing 125 of the cradle. Sides of the smartphone are adjacent the top arm 129 and the bottom arm 127, with the tabs (of which tabs 131*b,d* are visible) extending partially over the face of the smartphone, but not necessarily contacting the face of the smartphone.

Figure 6:
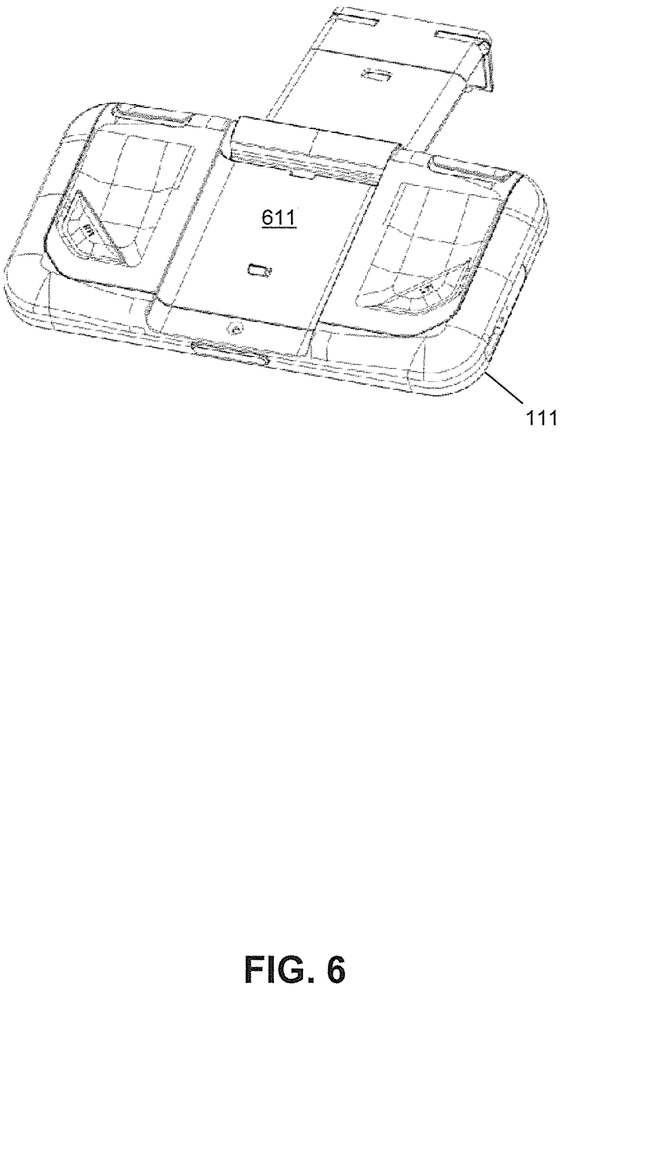
FIG. 6 is a further bottom perspective view of the game controller of FIG. 1.

FIG. 6 illustrates a further bottom perspective view of the game controller of FIG. 1, with the cradle in the open position. In FIG. 6, a latitudinal cutout 611 extends across the base, with the latitudinal cutout dimensioned to receive the backing of the cradle.

Figure 7:
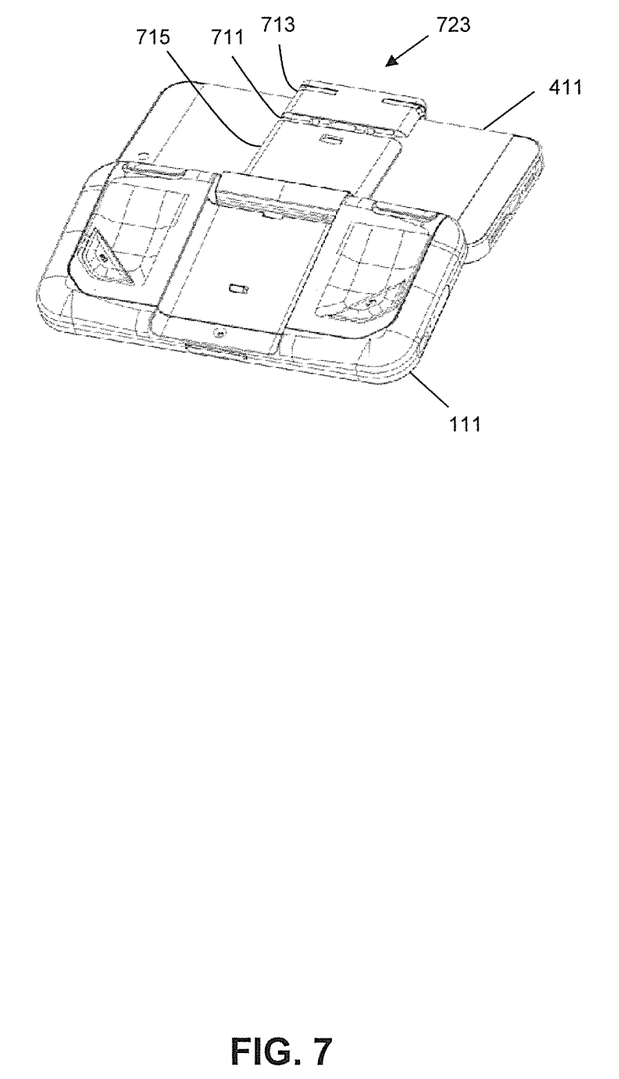
FIG. 7 is a further bottom perspective view of the game controller of FIG. 1 with a smartphone held in a cradle.

FIG. 7 illustrates a further bottom perspective view of a game controller in accordance with aspects of the invention, with a cradle 723 in the open position, extending from the base 111, and retaining a smartphone 411. As may be seen in FIG. 7, the backing of the cradle is segmented into an upper plate 713 and a lower plate 715, which in the embodiment of FIG. 7 are substantially coplanar. With the smartphone retained by the cradle, a small gap 711 is visible between the upper plate and the lower plate.

Figure 8:
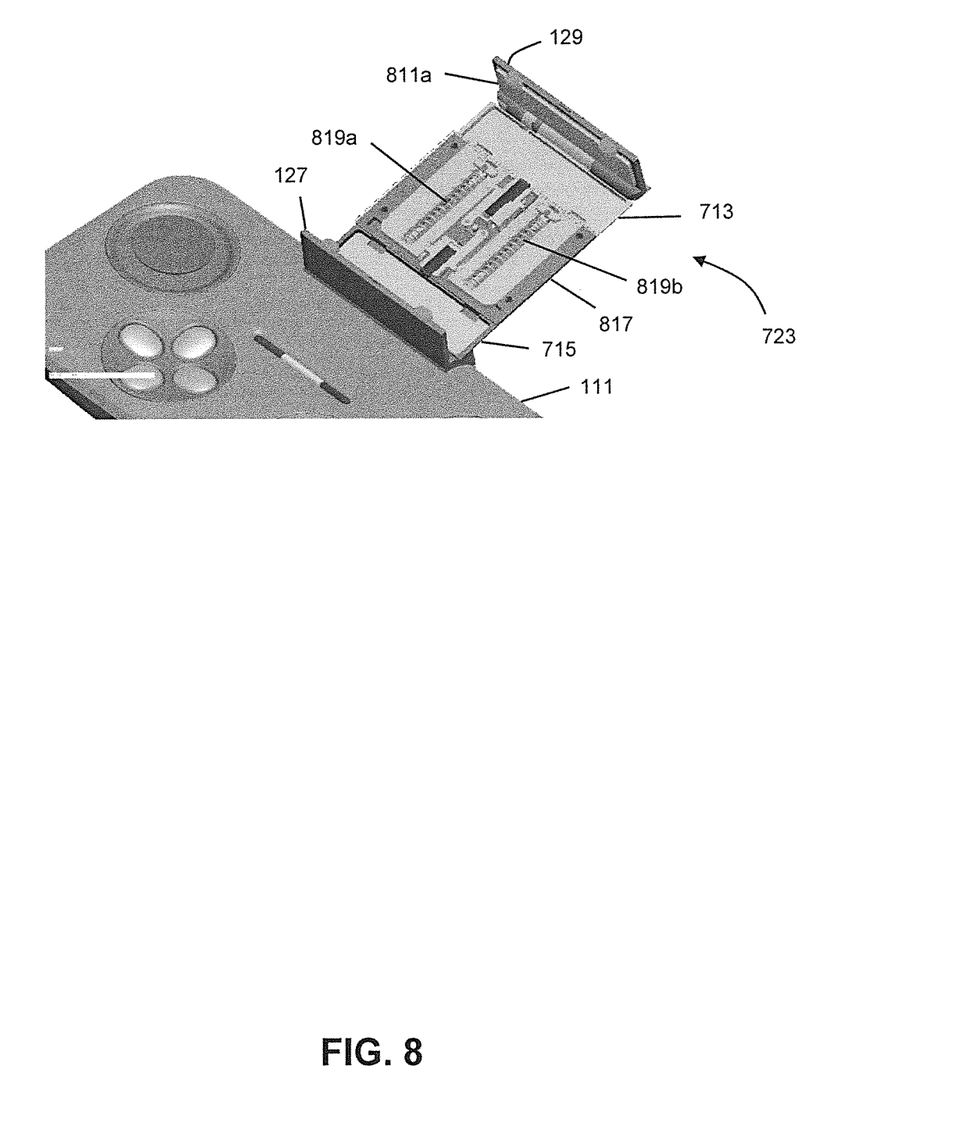
FIG. 8 is a partial cut-away view of a cradle in accordance with aspects of the invention.

FIG. 8 illustrates a partial top cut-away perspective view of the game controller of FIG. 7. In FIG. 8, the cradle 723 is in the extended open position with respect to the base 111. The upper plate 713 and the lower plate 715 of the backing can be seen as connected by an intermediate plate 817, with a lower portion of the intermediate plate overlying the lower plate, and an upper portion of the intermediate plate overlying the upper plate. The intermediate plate, shown in partial cut-away view, includes springs 819*a,b*, which are coupled to the lower and upper plates. The springs normally bias the upper and lower plates towards one another. Extension of the springs allows for separation of the upper and lower plates, and therefore the arms 127, 129 extending from the lower and upper plates, respectively. When separated, the arms, through bias of the plates, are pulled towards one another, providing a clamping action and assisting in retention of a smartphone or other handheld display device in the cradle. In addition, in some embodiments, and as illustrated in FIG. 8, an inner facing surface of the upper arm 129 includes a pad 811*a* (with a similar pad on an inner facing surface of the lower arm 127, not visible in FIG. 8). The pad is preferably of a somewhat compliant material, which also preferably provides for increased frictional forces when contacting the sides of a smartphone, and in some embodiments comprises an ethylene vinyl acetate (EVA) polymer.

Figure 9:
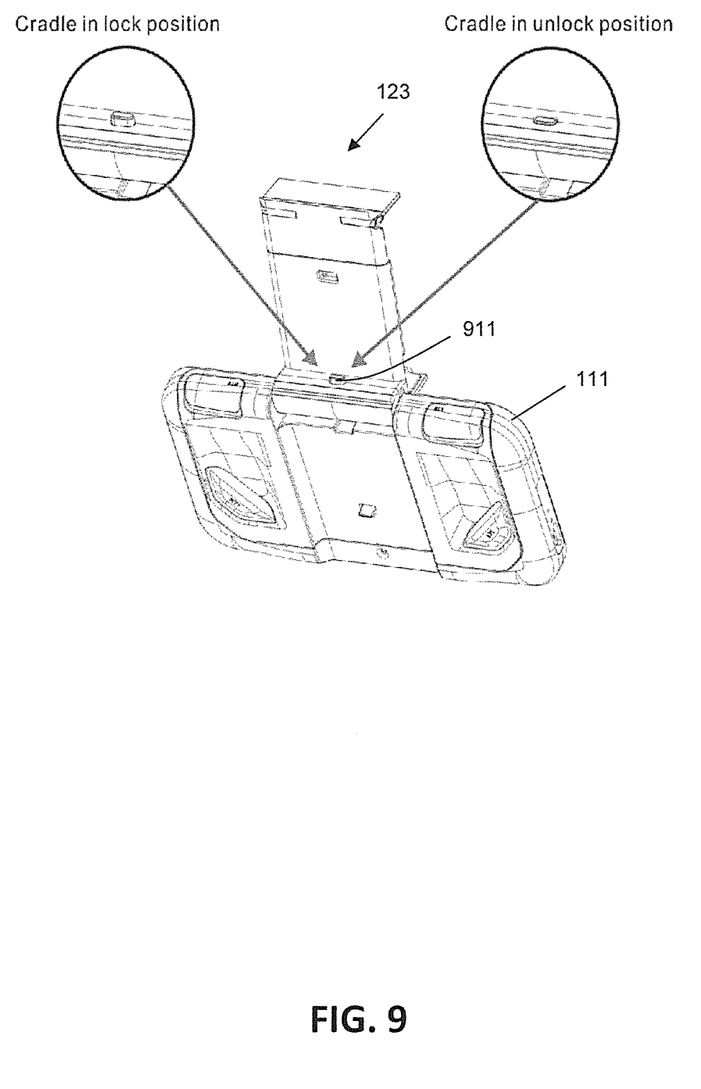
FIG. 9 is a perspective view of game controller showing aspects of a cradle lock in accordance with aspects of the invention.

Some embodiments include a lock mechanism for locking the cradle in the open position. FIG. 9 illustrates a rear perspective view of a game controller in accordance with aspects of the invention, with the cradle 123 in the open position with respect to the base 111. An unlock button 911 is provided on a connecting hinge portion of the cradle. Depression of the unlock button allows the cradle to be unlocked and moved from the open position.

Figure 10:
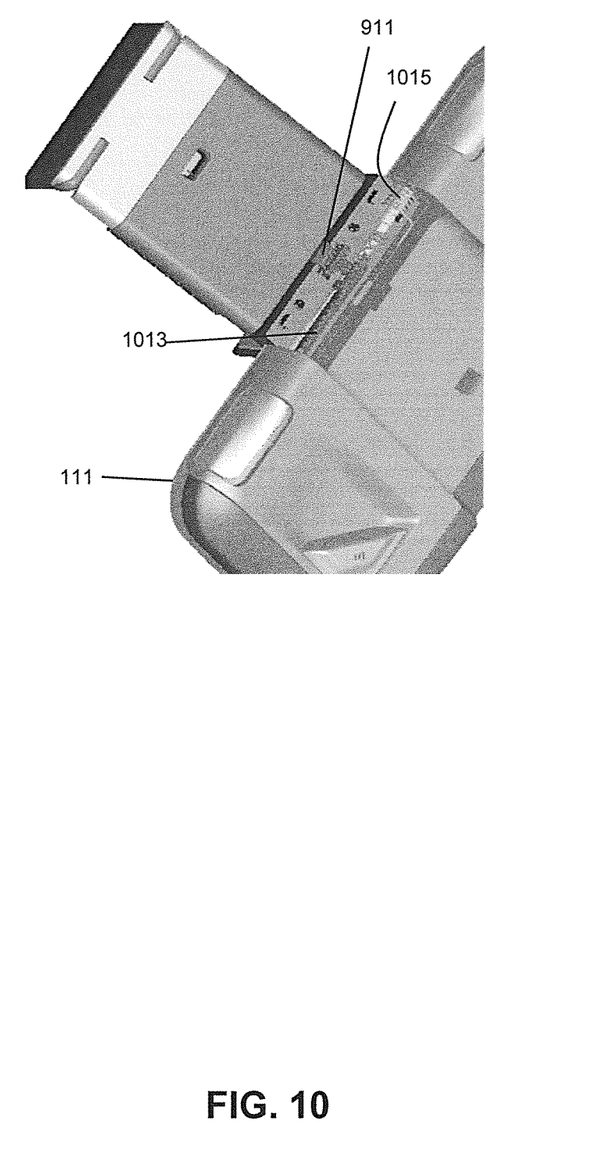
FIG. 10 is a partial cut-away view showing aspects of a cradle lock in accordance with aspects of the invention.

Details of an example cradle open position locking system may be seen in the partial bottom cut-away perspective view of FIG. 10. In FIG. 10, the connecting hinge portion of the cradle, in a cutout in a sidewall of the base 111, is partially removed, allowing for view of details of the example locking system. In the example locking system, a post 1013 includes a foot insertable into a cavity (not shown) in a side of the cutout in the sidewall of the base when the cradle is in the open position, but not at when the cradle is in other positions. Insertion of the foot of the post into the cavity prevents pivoting movement of the cradle with respect to the base. In some embodiments, the post is parallel to, but offset from, an axis of rotation of the cradle with respect to the base, so as to achieve this effect. In some embodiments, the sidewall comprises a plurality of different cavities for receiving the foot of the post at a plurality of different opened positions.

The post is normally biased by a spring 1015 towards the side of the cutout in the sidewall. The biasing of the post by the spring allows for automatic insertion of the foot of the post into the cavity when the cradle is in the open position, as well as serving to retain the foot of the post in the cavity thereafter.

Depression of the button 911 results in contact between the button and the post, with force of the contact causing the post to overcome the bias provided by the spring. In overcoming the bias provided by the spring, the post moves away from the side of the cutout in the sidewall, and the foot of the post withdraws from the cavity. This unlocks the cradle, and allows the cradle to move from the open position, for example to pivot to the closed position. In some embodiments the button contacts an angled side of the post, allowing for translation of movement of the button in one direction to movement of the post in a substantially orthogonal direction.

Figure 11:
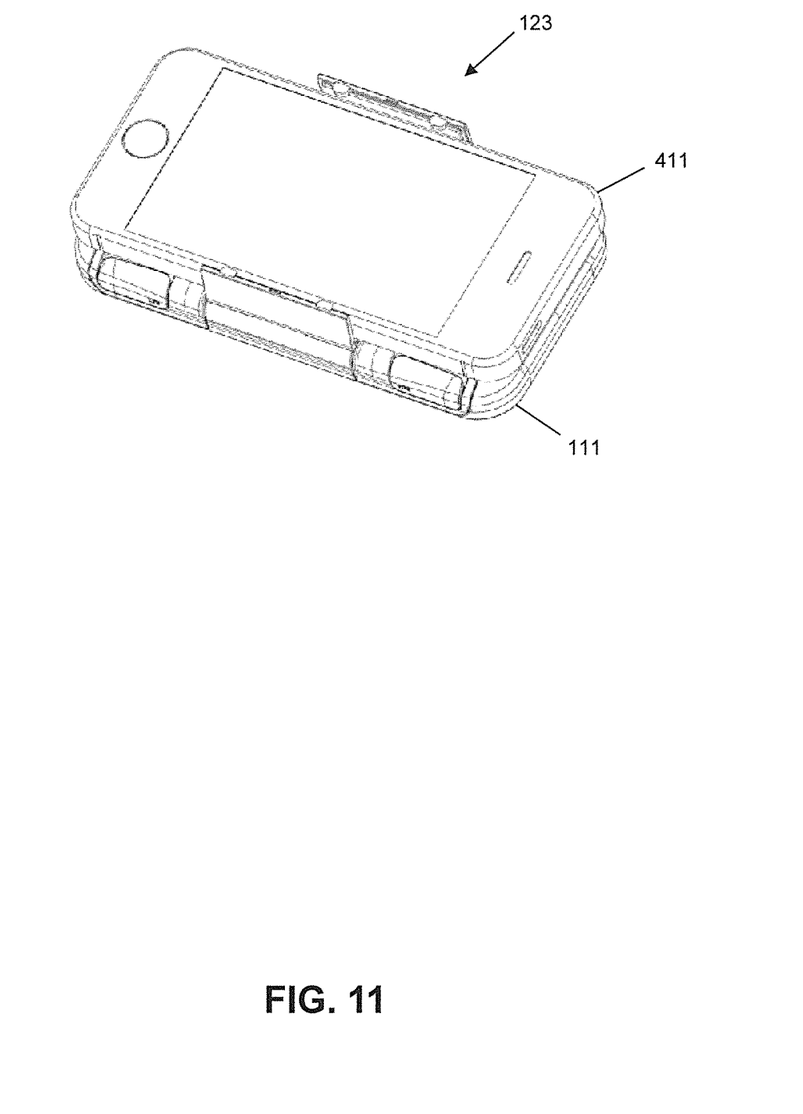
FIG. 11 is a further view of a game controller and smartphone in accordance with aspects of the invention.

FIG. 11 illustrates a further bottom perspective view of the game controller of FIG. 1, with the cradle in the closed position and retaining a smartphone. With the cradle in the closed position, a rear surface of the smartphone 411 is substantially adjacent the bottom wall of the base 111, with the rear of the smartphone and the bottom wall of the base separated by the backing of the cradle.

As illustrated in FIG. 11, the base 111 of the controller and the smartphone 411 have substantially identical footprints. Similarity in size of the smartphone and the base allows for ease of holding of the smartphone and controller with the cradle in the closed position, for example while using the smartphone as a telephone. In some uses, for example, a player may play a videogame executing on the smartphone, receive a phone call on the smartphone, pause play of the videogame, move the cradle to the closed position, and conveniently hold the combined game controller and smartphone as one may often hold a phone for phone conversations.

Figure 12:
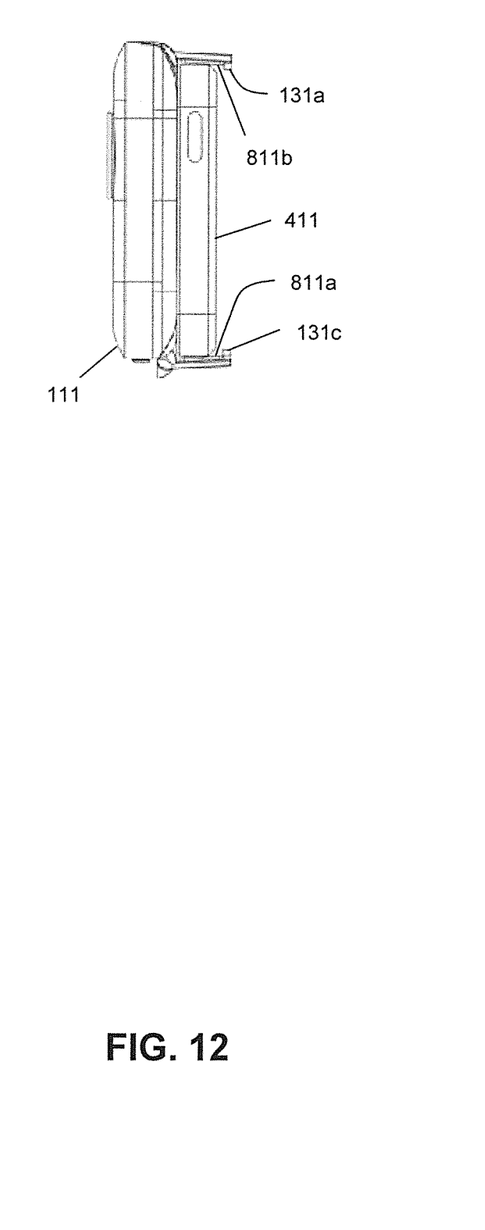
FIG. 12 is a side view of a game controller and smartphone in accordance with aspects of the invention.

FIG. 12 illustrates a side view of the game controller of FIG. 1, with the cradle in the closed position and retaining the smartphone. In FIG. 12, the smartphone 411 is approximate the base 111 of the controller, with the smartphone held in the cradle. Pads 811*a* and 811*b*, on the lower and upper arms, respectively, of the cradle assist in retention of the smartphone by the cradle. Similarly, tabs extending inward from the arms, with tabs 131*a,c* visible in FIG. 12, also assist in retention of the smartphone by the cradle.

Figure 13:
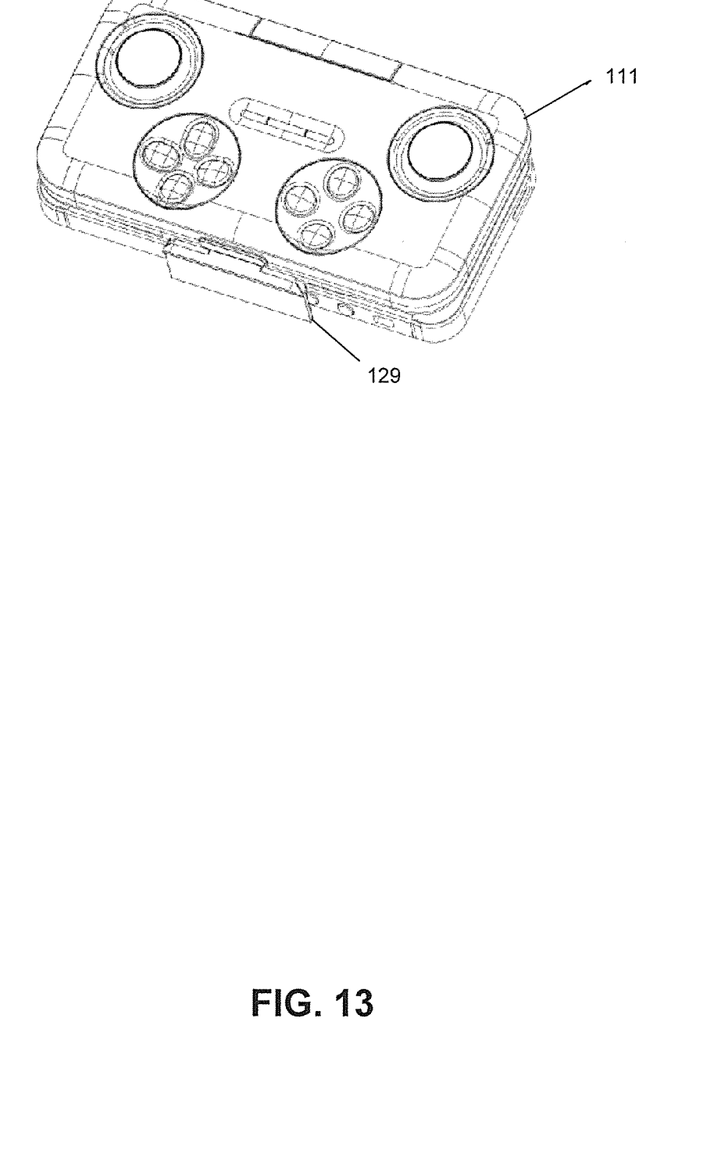
FIG. 13 is a perspective view of a game controller and smartphone in accordance with aspects of the invention.

FIG. 13 illustrates a further top perspective view of the game controller of FIG. 1, with the cradle in the closed position and retaining a smartphone. In FIG. 13, the base 111 of the controller overlies the smartphone, with arms, for example arm 129, assisting in retention of the smartphone.

Although the invention has been discussed with respect to various embodiments, it should be recognized that the invention comprises the novel and non-obvious claims supported by this disclosure.

What is claimed is:
1. A videogame controller, comprising:
a housing having a top wall and a bottom wall coupled by side walls;
a plurality of input devices extending through the top wall of the housing;
a cradle, dimensioned to hold a handheld device, pivotably coupled to the housing, the cradle pivotable from a position in a latitudinal cutout in the bottom wall of the housing to a position extending away from the housing.

2. The videogame controller of claim 1, wherein the cradle includes a backing and opposing first and second arms, the first min extending from about a first end of the backing and the second arm extending from about a second end of the backing, the first and second ends of the backing being opposing ends of the backing.

3. The videogame controller of claim 2, wherein the cradle is pivotably coupled about a first of the side walls of the housing.

4. The videogame controller of claim 3, wherein a portion of the cradle is inset within a cutout of the first side wall.

5. The videogame controller of claim 1, wherein the plurality of input devices comprise a pair of analog stick controls and a plurality of game pad buttons and a plurality of directional buttons.

6. The videogame controller of claim 5, further comprising a pair of input devices positioned in hollows of the bottom wall of the housing.

7. The videogame controller of claim 2, wherein the cradle includes tabs extending parallel to the base from end of each of the first and second arms.

8. The videogame controller of claim 7, wherein each of the first and second arms includes pads facing each other.

9. The videogame controller of claim 7, wherein the first and second arms are pivotably connected to the backing, the first and second arms moveable from a position substantially parallel to the backing to a position substantially orthogonal to the backing.

10. The videogame controller of claim 1, wherein the housing is dimensioned substantially the same as a smartphone.

11. The videogame controller of claim 2, wherein the backing includes a first insert and a second insert biased towards each other by springs, such that the first arm and the second arm form ends of a clamping device for holding a smartphone between them.

12. A videogame controller, comprising:
a housing having a top wall and a bottom wall coupled by side walls;
a plurality of input devices extending through the top wall of the housing;
a cradle, dimensioned to hold a handheld device, pivotably coupled to the housing, the cradle pivotable from a position about the bottom wall of the housing to a position extending away from the housing,
wherein the cradle includes a backing and opposing first and second arms, the first arm extending from about a first end of the backing and the second arm extending from about a second end of the backing, the first and second ends of the backing being opposing ends of the backing,
wherein the cradle is pivotably coupled about a first of the side walls of the housing,
wherein a portion of the cradle is inset within a cutout of the first side wall, and further comprising a post coupled to the cradle, a foot of the post insertable into a cavity in a side of the cutout.

13. The videogame controller of claim 12, further comprising a spring biasing the post towards the side of the cutout.

14. The videogame controller of claim 13, further comprising a button biased by the post to protrude from the cradle, the button depressible to bias the post away from the side of the cutout such that the foot of the post clears the cavity in the side of the cutout.

15. A videogame controller device, comprising:
a base including a plurality of input devices; and
a cradle hingedly coupled to the base so as to be moveable from a closed to an open position, the cradle including a substantially square U-shaped bracket for receiving a smartphone, the cradle including a post insertable into a cavity of the base when the cradle is in the open position.

16. The device of claim 15, wherein the post is biased towards a wall of the base including the cavity.

17. The device of claim 16, wherein the post is biased by a spring.

18. The device of claim 15, wherein the cradle further includes tabs extending inwardly from ends of the square U-shaped bracket.

19. The device of claim 15, wherein the cradle further includes pads on inward facing sides of the square U-shaped bracket.

20. The device of claim 15, wherein the sides of the square U-shaped bracket are foldable towards a base of the square U-shaped bracket.

\* \* \* \* \*